United States Patent [19]

Jackson et al.

[11] 4,353,490

[45] Oct. 12, 1982

[54] PANNIER MOUNTING SYSTEM FOR CYCLES

[76] Inventors: W. Shaun Jackson, 809 Sycamore, Ann Arbor, Mich. 48104; Leslie E. Bohm, 29560 Rutherland, N., Southfield, Mich. 48076

[21] Appl. No.: 196,426

[22] Filed: Oct. 14, 1980

Related U.S. Application Data

[63] Continuation-in-part of Ser. No. 84,400, Oct. 24, 1979, abandoned, which is a continuation-in-part of Ser. No. 768,467, Feb. 14, 1977, Pat. No. 4,174,795.

[51] Int. Cl.³ .............................................. B62J 9/00
[52] U.S. Cl. .................................... 224/32 A; 224/39; 280/289 A
[58] Field of Search ................. 280/289 A, 769; 224/32 A, 32 R, 39; 24/230 BC

[56] References Cited

U.S. PATENT DOCUMENTS

| | | |
|---|---|---|
| 460,332 | 9/1891 | Coates . |
| 1,030,844 | 6/1912 | Howell . |
| 1,260,937 | 3/1918 | Muller, Jr. . |
| 2,428,906 | 10/1947 | Cannella ............... 150/34 X |
| 2,956,324 | 10/1960 | Klein ................ 24/230 BC |
| 3,406,885 | 10/1968 | Zurmuhlen ............ 224/32 R |
| 3,572,758 | 3/1971 | Lee ........................ 280/296 |
| 3,795,354 | 3/1974 | Stippich ................ 224/32 |
| 3,875,623 | 4/1975 | Johnston ........... 24/230 BC X |
| 3,921,868 | 11/1975 | Reichbach ............. 224/32 |
| 3,934,770 | 1/1976 | Larsen ................. 224/33 |
| 3,937,374 | 2/1976 | Hine, Jr. ............. 224/32 A |
| 3,963,158 | 6/1976 | Clenet .................. 224/31 |
| 3,970,229 | 7/1976 | Norinsky .............. 224/31 |
| 4,053,091 | 10/1977 | Martelet .............. 224/32 |
| 4,154,382 | 5/1979 | Blackburn ............. 224/39 |
| 4,174,795 | 11/1979 | Jackson et al. ........ 224/32 A |

FOREIGN PATENT DOCUMENTS

| | | |
|---|---|---|
| 487902 | 11/1952 | Canada . |
| 553350 | 6/1932 | Fed. Rep. of Germany . |
| 572417 | 3/1933 | Fed. Rep. of Germany . |
| 599075 | 6/1934 | Fed. Rep. of Germany ... 224/32 A |
| 638917 | 11/1936 | Fed. Rep. of Germany . |
| 1090075 | 3/1955 | France ............... 224/32 R |
| 168511 | 9/1959 | Sweden . |
| 242067 | 4/1946 | Switzerland .......... 224/32 A |
| 20949 | of 1901 | United Kingdom . |
| 553487 | 5/1943 | United Kingdom ...... 224/32 A |
| 614967 | 12/1948 | United Kingdom ...... 224/32 A |

*Primary Examiner*—Allan N. Shoap
*Attorney, Agent, or Firm*—Krass, Young & Schivley

[57] ABSTRACT

A pannier mounting system is disclosed for mounting pannier bags alongside the rear wheel of a bicycle. The system includes a strut supported platform mounted to the bicycle frame, which platform includes longitudinally extending channel slots adapted to slidably receive corresponding elongated track elements mounted to the pannier assembly. The pannier assembly includes a fabric bag and liner panel which is disposed in the interior of each bag secured to the wheel side of the bag. The pannier assembly is adjustable longitudinally by sliding movement of the track in the channel and is maintained in proper position for heel clearance by means of a locating element mounted to the lower end of the stiffener panel. The locating element positively engages the lower portions of the strut members in longitudinally adjustable positions and acts through the liner panel to securely position the pannier in any adjusted position. A quick release retainer secures the locating element in engagement with the strut members.

16 Claims, 8 Drawing Figures

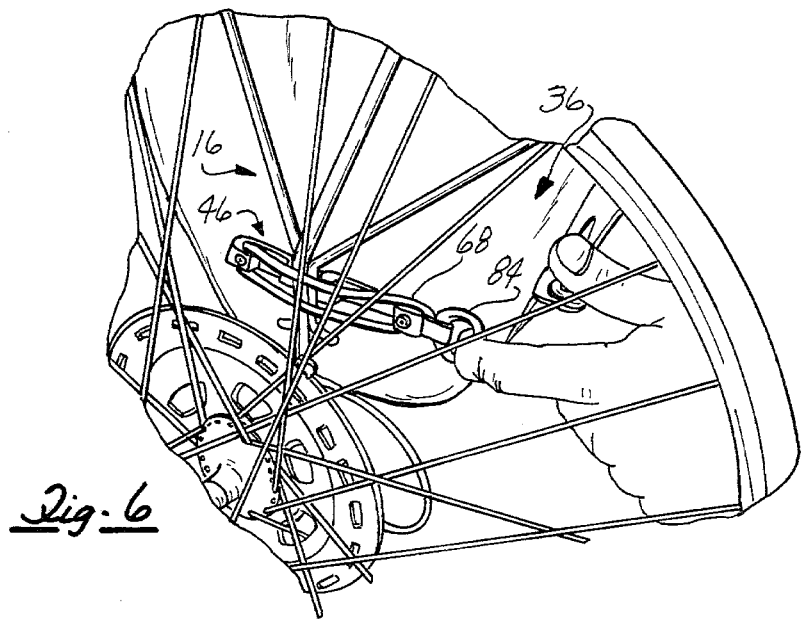
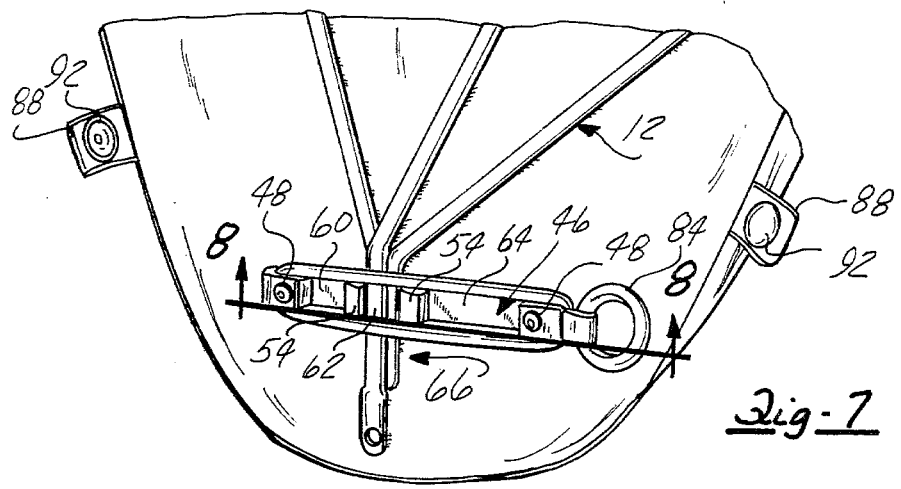

PANNIER MOUNTING SYSTEM FOR CYCLES

CROSS REFERENCE TO RELATED APPLICATIONS

This application is a continuation-in-part of application Ser. No. 84,400, filed Oct. 24, 1979, now abandoned which is a continuation-in-part of Ser. No. 768,467 Feb. 14, 1977, now U.S. Pat. No. 4,174,795, issued Nov. 20, 1979.

BACKGROUND DISCUSSION

This invention concerns panniers for use with bicycles and the like.

It is often convenient for bicycle riders to have some arrangement for mounting luggage items such as pannier bags for the storage and carrying of items in convenient locations which do not encumber the bicycle such as to interfere with freedom of movement and so as to be secured reliably and yet at the same time enable ready access for removal for the convenience of the rider.

In copending application Ser. No. 84,400, filed Oct. 24, 1979 and in U.S. Pat. No. 4,174,795, both of the present inventors, there is disclosed a pannier mounting arrangement for pannier bags of the type mounted alongside the rear wheel of the cycle which is highly advantageous in that it enables ready mounting and release of the pannier bags while supporting the same in a very reliable and secure manner with a minimum number of hardware components.

Such arrangement includes a platform rack mounted over the rear wheel by means of a system of strut members and forwardly projecting connectors which connect to the bicycle frame. The strut system is mounted adjacent to the axle of the rear wheel.

The rack is provided with longitudinally extending slots which are adapted to receive elongated track elements carried by the pannier bags such that a very strong support for the bag weight is provided with minimum number of hardware items and yet the bag is readily mounted and dismounted.

The arrangement shown in U.S. Pat. No. 4,174,795 shows a pannier bag secured in longitudinal position by means of snaps carried by a flap on the pannier bag which cooperates with snaps carried on the rack structure to secure the pannier securely in the longitudinal or fore and aft position.

In adapting a platform rack to bicycle frames of varying sizes and configurations, the position of the carrier rack relative to the bicycle frame will vary such that some degree of adjustment in the position of the pannier bag is desirable in order to maintain a minimum heel clearance such that the rider's heel will clear the bag during the peddling movements.

At the same time, the bag should be as far forward as possible for optimum weight distribution of the loaded cycle.

Such longitudinal securement is advantageously of the same qualities as the mounting system. That is, a very secure retention thereof is provided precluding shifting of the load weight and loss of adjustment during maneuvers or after extended touring. Such securement should be with a minimum number of components, loose hardware avoided and should be highly reliable. Such arrangement also should enable quick and convenient mounting and dismounting for the convenience of the rider.

Accordingly, it is an object of the present invention to provide a pannier mounting system for cycle vehicles which enables the longitudinal adjustment in the positioning of the pannier bag with respect to the mounting rack which is very secure and yet simple and convenient to use.

It is another object of the present invention to provide such arrangement in which a minimum number of hardware components are required.

SUMMARY OF THE INVENTION

These and other objects of the present invention, which will become apparent upon a reading of the following specification and claims, are achieved by a pannier mounting system in which a platform rack is mounted over the rear wheels of the cycle by a system of strut members with a forwardly projecting longitudinally adjustable connection adapted to be connected to the bicycle frame.

Each pannier bag is provided with a stiff liner panel which is disposed against the inside or wheel side of the pannier bag and to which is mounted a longitudinally elongated track element which is adapted to be received in slots formed in each side of the platform rack.

Mounted at the lower end of each liner panel is a locating element which is mounted such as to be adjustably positioned on the panel and also formed with a projection series which enables an adjustability of the pannier position longitudinally by alternate longitudinally offset engagement positions with respect to the strut members.

The combination of the liner panel and the positive engagement of the locating element produces a very secure fore and aft or longitudinal positioning of the pannier with respect to the rack platform. The locating element comprises an elongate bar element having a series of projecting lugs with recesses or spaces therebetween adapted to receive the lower end of the strut members by being positioned between adjacent lug elements.

Strut members are maintained in position with a quick release retainer arrangement comprised of an elastic loop secured at one end of the locator element and releasably enagageable with the other end of the bar so as to be able to be drawn across the outside of the strut members and secured. This is by means of a clip element adapted to be disposed beneath a longitudinally projecting end portion on the locator element with a release ring enabling easy manipulation of the clip element causing it to be cammed out to release the elastic element.

DESCRIPTION OF THE DRAWINGS

FIG. 6 is an enlarged fragmentary view of the rear wheel of a bicycle showing the details of engagement of the locator element with the rack/frame portion thereof.

FIG. 7 is an enlarged detailed view of the locator element engaging portions of the rack strut members.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
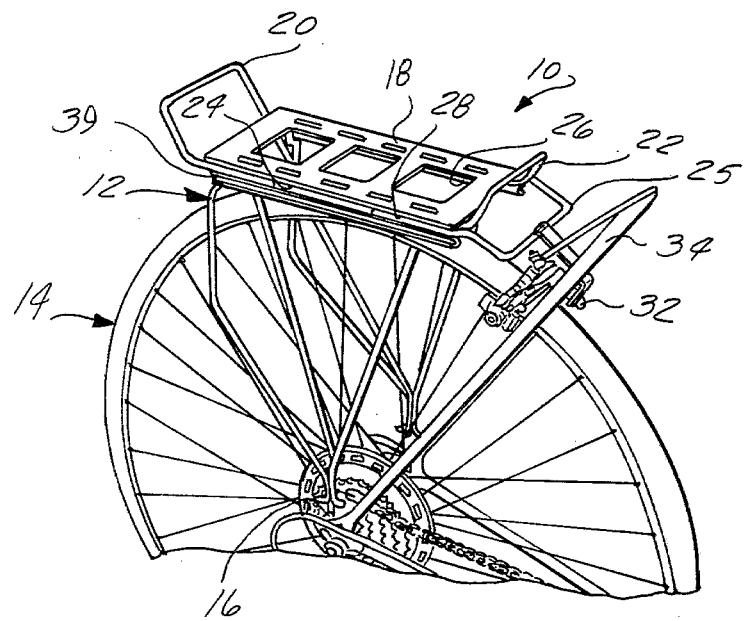
FIG. 1 is a perspective fragmentary view of a rear wheel of a bicycle, showing the carrier rack forming a part of the mounting system according to the present invention.

Referring to FIG. 1, the mounting system according to the present invention makes use of a carrier rack 10 of the general type described in the above-noted patent and application.

The carrier rack 10 includes a strut system generally indicated at 12 including strut members extending on either side of the bicycle rear wheel 14 being mounted at the lower end thereof by means of a machine screw bolt 16 to the bicycle frame members. The strut system 12 includes three strut members configured as described in detail which obtains certain advantages as set forth in that patent.

The strut system 12 supports a generally planar platform 18 which is positioned atop the rear wheel 14. The platform 18 is formed with a series of channel slots 24 and 26 of generally partially circular shape such as to slidably receive the formed rod or tube members comprised of U-shaped members, i.e., a rear support 20, a front support 22 and an attachment frame 25.

The rear support 20 and front support 22 are formed to extend upwardly so as to provide support for luggage items mounted to the top of the carrier platform 18 and to provide attachment points for straps (not shown). Each support has end portions slidably received in channel slots 24 and 26 formed parallel to the longitudinal axis of the bicycle with the carrier frame in the installed position which enables the brackets either to be moved or adjusted in their position.

Suitable set screw securement means are provided (not shown) which are described in detail in the above-referenced U.S. Patent. The frame 25 similarly has end portions thereof 28 slidably received in the channel slots 24 and 26 such as to be extensible along the longitudinal direction to provide positioning of an attachment strap 30 which is adapted to be attached at 32 to the bicycle frame members 34.

This adjustability affords adaptation to differing bicycle sizes and frame configurations.

Since the carrier frame including the strut system are described and claimed in detail in the above-mentioned patent and patent application, a more complete description is not here included.

Figure 2:
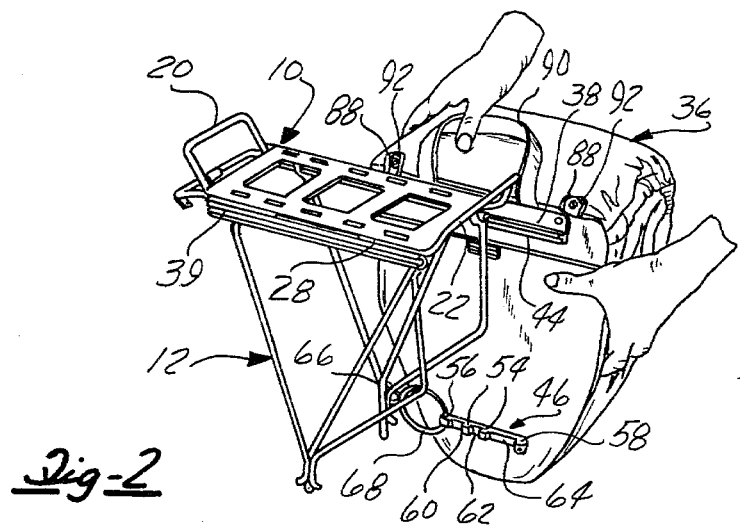
FIG. 2 is a perspective view of the carrier rack with a pannier being installed thereon according to the mounting system of the present invention.

According to the concept of the present invention, the pannier bag assembly, indicated at 36 in FIG. 2, is supported and adapted for longitudinal adjustment by a system including a liner panel 40 substantially conforming to the inside face of a fabric pannier bag 41 with a support of the upper edge of the bag vertical to the weight of the bag on the upper edge thereof by an elongate element cooperating with a channel slot formed in platform 18. The liner panel 40 is relatively stiff and may be constructed of lightweight aluminum or other suitable metal extending downwardly into juxtaposition with the rear wheel axle frame support.

The fore and aft positioning is by means of a positively acting locator element 46 secured to the lower part of the liner panel 40 and by virtue of being fastened to the stiffener panel, serves to very securely position the pannier bag assembly 36 as a whole due to the relative fore and aft stiffness of the liner panel 40.

Figure 4:
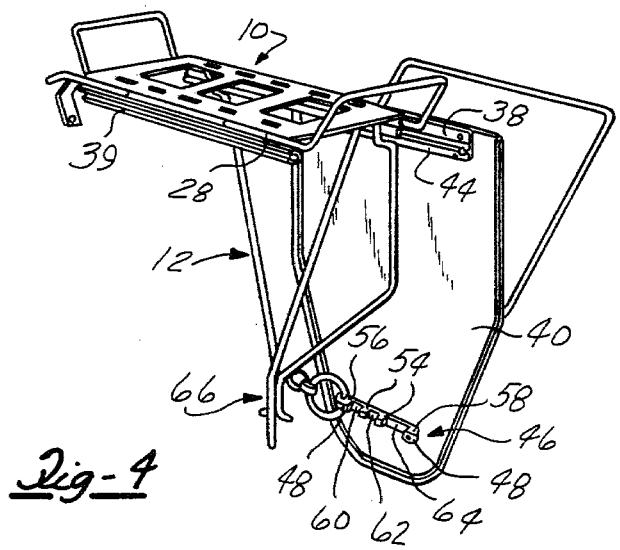
FIG. 4 is a fragmentary view of the carrier rack and the liner panel partially assembled thereto.
Figure 5:
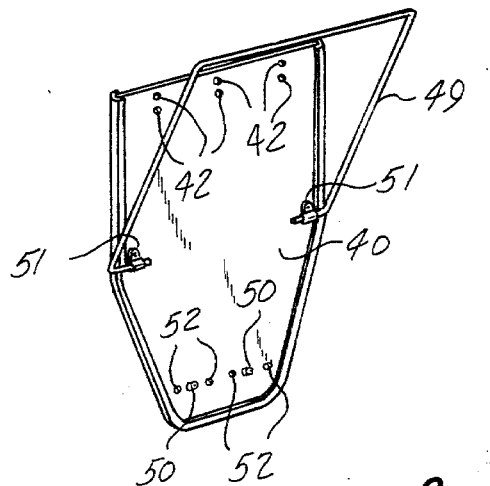
FIG. 5 is a rear perspective view of the liner panel and hold-open U member.

This arrangement is shown in FIG. 2 in which a pannier bag 36 is shown being installed. This includes a hanger bracket 38 being formed of a suitable hard rubber or plastic material secured to the pannier bag assembly 36 by means of screw fasteners passing through the pannier bag assembly 36 and through the liner panel 40 (FIG. 4) and receiving lock nuts 42 on the opposite face of the liner panel 40.

Mounted to the liner panel 40 is a hold-open U-frame 49 pivoted by means of pivot retainers 51 to the liner panel 40 which, as disclosed in the above-referenced patent application, is for the purpose of providing convenient hold-open pannier bags for loading and unloading. The pannier bag is of a suitable fabric material such as a nylon so as to be suitably durable for such application.

Figure 3:
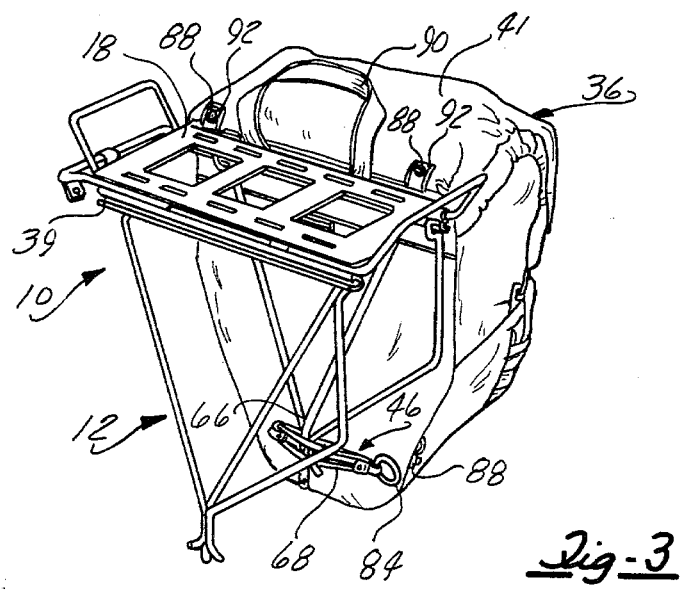
FIG. 3 is a perspective view of the carrier rack and pannier with installation thereof completed.

The hanger bracket 38 is provided as mentioned with an elongate track 44 of a configuration adapted to mate with the channel slots 39 such as to be slidably received therein as shown in FIGS. 2 and 3.

Upon installation thereof, the weight of the pannier bag assembly 36 is borne along the entire length of the elongate track 44 and is strongly reinforced by means of a securement to the liner panel 40.

In order to secure the pannier bag assembly 36 in the fore and aft or longitudinal directions, there is provided a locator element 46 mounted to the lower portion of the pannier bag assembly 36. This is by securement to the liner panel 40, in similar fashion as to the hanger bracket 38, with a pair of screw fasteners 48 provided which receive threaded collars 50 on the inside of the liner panel 40.

A hole pattern comprised of a series of two sets of three holes 52 is provided in the liner panel 40 to provide a degree of longitudinal adjustability in mounting of the locator element 46 in order to vary the longitudinal position of the pannier bag assembly 36 in its final installed position.

Locator element 46 comprises an elongate bar formed with a series of intermediate lug projections 54 and end lugs 56 and 58 to form a series of intermediate recesses 60, 62 and 64, with these recesses being of varying width such as to accommodate strut members of varying thickness and inclination.

The recesses as noted are adapted to engage the lower strut member portions 66 (FIG. 3) which provide a stationary structure with respect to the bicycle frame.

Figure 8:
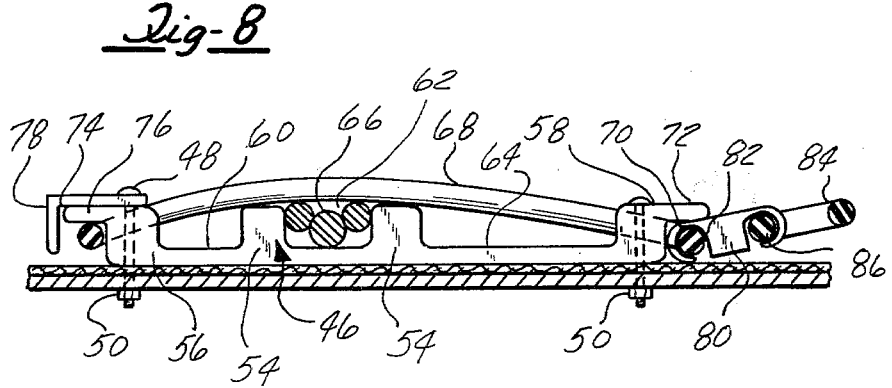
FIG. 8 is a sectional view of the locator element shown mounted to the pannier bag assembly.

Upon completion of the installation thereof and proper longitudinal positioning of the pannier bag assembly 36 and advance of the pannier bag assembly 36 to the proper adjusted position, the lower strut member portions 66 are positioned intermediate one of the recesses 60, 62 or 64 and a retainer arrangement comprised of an elastic loop 68, of a suitable material such as neoprene rubber, is drawn across the lower strut member portions 66 and the locator element 46, and hooked in a pocket formed by an overhang 72 formed on the end lugs 58 (FIG. 8).

Accordingly, a positive location of the bottom of the liner panel 40 is provided in the fore and aft or longitudinal direction which, due to the stiffness of the liner panel 40 in this direction and the guided or constrained longitudinal engagement of the liner panel 40 on the platform 18, precludes any lateral movement of the pannier bag assembly 36.

This also locates the pannier bag assembly 36 against outward swinging movement away from the bicycle frame.

The elastic loop 68 is releasably secured beneath overhang 72 (FIG. 8) and maintained at the other end in a recess 74 formed by an overhang 76 of the end lug 56 with a clip 78 which prevents escape of the elastic loop 68 secured beneath screw fasteners 48.

A cam element 80 is formed with a recess 82 receiving the other end of the elastic loop 68 and is also provided with a recess 86 in which is received a pull ring 84. The elastic loop 68 is connected at the center of the clip 78 such that a portion offset from the point of connection is slidably receivable in recess 74.

Thus, with a pulling motion applied by the pull ring 84 (FIG. 6), the elastic loop 68 is cammed with the cam element 80 about the overhang 72 for relatively easy release.

It will be noted that the entire assembly remains connected so that no loose hardware items are used.

Accordingly, ready connection and release are afforded by the finger manipulation of the pull ring 84.

The pannier bag 41 is provided with tabs 88 provided with oppositely faced male and female snaps 92 for connecting together pairs of pannier bag assemblies 36 such as to facilitate hand-carrying of the luggage items with carrier straps 90 provided for this purpose.

It can be seen that the above-recited objects of the present invention have been achieved by the arrangement described, i.e., a positive fore and aft location of the entire assembly is provided by the connection of the recesses with the relatively stationary structure, i.e., the lower regions of the strut members and the combination with the liner panel 40 achieves a secure location of the entire assembly.

The system uses a minimum number of components which are simple and highly reliable in function and do not involve separate items. A ready connect/disconnect is provided by the single release of the retainer element by enabling withdrawal of the pannier within a matter of seconds.

We claim:

1. A pannier mounting system for mounting panniers on a cycle vehicle having a longitudinal axis frame and a rear wheel, comprising:
   rack means including a platform and means adapting said platform to be horizontally mounted on said cycle frame over said rear wheel of said cycle vehicle;
   means for mounting a pannier on said platform by guided sliding longitudinal interengagement therebetween;
   a member relatively stiff in a longitudinal direction and secured to said pannier extending downwardly from the platform; and
   means for releasably securing said pannier against longitudinal relative movement with respect to said platform, the securing means including a locator element mounted to the lower region of said member and adapted to engage relatively stationary structure carried by said cycle vehicle thereby precluding disengagement of said pannier and said platform by relative longitudinal movement therebetween after installation thereof, the locator element being generally elongate and including a plurality of recesses therein adapted to engage the stationary structure, said securing means further including means for retaining said locator element in engagement with said stationary structure.

2. The pannier mounting system according to claim 1 wherein the retaining means includes an elastic element and means for securing said elastic element drawn over said relatively stationary structure and at least one of said recesses.

3. The pannier mounting system according to claim 2 wherein said means for mounting said platform comprises a strut system including strut member portions thereof mounted to said cycle vehicle frame and wherein said relatively stationary structure comprises said portion of said locator element positioned to engage said member portions.

4. The pannier mounting system according to claim 3 wherein said pannier comprises a fabric bag and further including a liner panel defining said relatively stiff member and wherein said liner panel is mounted to the interior of said bag along the inside surface thereof adjacent to said cycle frame structure in said installed position and wherein said locator element is mounted to said pannier bag and liner panel on the lower regions thereof with said pannier in the installed position.

5. The pannier mounting system according to claim 4 wherein said liner panel is formed with a series of holes extending in a longitudinal series and said means for mounting said locator element to said liner panel comprises fastener elements passing through said locator element and at least two of said holes in said series, whereby said locator element may be mounted in alternate longitudinally adjusted positions with respect to said liner panel.

6. The pannier mounting system according to claim 5 wherein said recesses are longitudinally spaced from each other.

7. The pannier mounting system according to claim 2 wherein said elastic element comprises a loop of elastic material secured at one end to one end of said locator element and means for releasably securing the other end thereof to the other end of said locator element.

8. The pannier mounting system according to claim 7 wherein said means releasably securing said other end of said elastic loop to said other end of said locator element includes a recess formed beneath said other end of said locator element and further including a cam clip secured to said elastic loop and having a portion offset from said point of connection to said elastic loop slidable into said recess and a pull connected to said cam clip at a point disposed clear of said recess, whereby said elastic loop may be readily released by releasing movement of said pull and camming action of said clip.

9. The pannier mounting system according to claim 1 wherein said means for mounting said pannier to said platform comprises a channel section defining a longitudinally extending slot and an elongate mounting element longitudinally slidable within said slot.

10. For use with a cycle vehicle having an elongte frame and a rear wheel, apparatus for mounting a pannier beside said rear wheel, comprising:

a rack mounted on said frame and disposed over said rear wheel;

means for mounting a pannier on said rack for sliding movement relative to said rack in a direction generally parallel to the longitudinal axis of said frame; and means for releasably securing said pannier against said sliding movement, the securing means including a locator element secured to said pannier at a location elevationally spaced from the mounting means and having a recess therein adapted to engage a portion of said frame, said securing means further including means retaining the locator element in engagement with the frame portion.

11. The apparatus of claim 10, wherein said mounting means includes an elongate track and structure defining a slot for slidably receiving said track therein.

12. The apparatus of claim 11, including a panel member relatively stiff in a direction generally parallel to said longitudinal axis, said locator element and one of said track and said structure being secured on said panel.

13. The apparatus of claim 10, wherein said locator element includes a plurality of recesses therein spaced from each other along said longitudinal axis, whereby to allow adjustment of the longitudinal position of said pannier relative to said rack.

14. The apparatus of claim 10, wherein said retaining means includes an elongate elastic element extending over said recess and said frame portion.

15. The apparaus of claim 14, wherein said locator element is elongate and said retaining means further includes means for securing one end of said elastic element to one extremity of said locator element and means for releasably securing the other end of said elastic element to the other extremity of said locator element.

16. The apparatus of claim 15, wherein:

said locator element includes a recess formed in said one extremity thereof, and said means for releasably securing the other end of said elastic element includes a cam clip secured to said other end of said elastic element, said cam clip having a first portion slidable into said last named recess and a second portion extending beyond and clear of said last named recess whereby said elastic element may be readily released by pulling movement of said second portion and camming action of said first portion.

* * * * *